United States Patent [19]

Sikorski

[11] 4,157,888

[45] Jun. 12, 1979

[54] GUIDE RAIL EXTRACTOR FOR MOLDED PLASTIC ARTICLES

[75] Inventor: Stephen L. Sikorski, Rochester, N.Y.

[73] Assignee: Eastman Kodak Company, Rochester, N.Y.

[21] Appl. No.: 855,142

[22] Filed: Nov. 28, 1977

[51] Int. Cl.² .............................................. B29F 1/14
[52] U.S. Cl. ............................... 425/556; 425/436 R; 425/444; 414/744
[58] Field of Search .................... 425/556, 444, 436 R, 425/436 RM, 554; 164/347, 269; 214/310, 1 BC, 1 BD, 1 BV; 264/334

[56] References Cited

U.S. PATENT DOCUMENTS

| | | | |
|---|---|---|---|
| 1,985,893 | 1/1935 | Goodrich et al. | 164/269 |
| 2,278,643 | 4/1942 | Braun | 425/436 RM |
| 2,314,120 | 3/1943 | Braun | 425/436 RM |
| 2,327,227 | 8/1943 | Tucker | 214/1 BC |
| 3,852,011 | 12/1974 | Maiocco | 425/556 |
| 3,910,740 | 10/1975 | Rees | 425/556 |

FOREIGN PATENT DOCUMENTS

102661 9/1941 Sweden ............................. 425/436 R

*Primary Examiner*—William R. Briggs
*Attorney, Agent, or Firm*—S. W. Gremban

[57] ABSTRACT

Article unloading apparatus is disclosed for use with a molding machine, the molding machine comprising first and second mold members reciprocally movable relative to one another between mold-open and mold-closed positions. The article unloading apparatus comprises a pair of guide rails movable apart to a retracted position and toward one another to an article receiving position. The pair of guide rails and the mold members are coupled together such that movement of the mold members to the mold-closed position, for molding an article, causes the guide rails to move to their retracted position in which they do not interfere with the molding operation. Movement of the mold members to the mold-open position, for unloading the molded article, causes the guide rails to move toward one another and between the mold members to their article receiving position. In the article receiving position, the guide rails are spaced from but in register with an article molded by the mold members. An ejecting mechanism ejects the article to the guide rails which guide the article away from the molding machine.

8 Claims, 16 Drawing Figures

GUIDE RAIL EXTRACTOR FOR MOLDED PLASTIC ARTICLES

BACKGROUND OF THE INVENTION

1. Field of the Invention

The invention relates generally to molding machines, and more particularly to article handling apparatus for use with a molding machine.

2. Description of Prior Art

Mechanisms for extracting or unloading molded articles from a molding machine upon separation of male and female mold members are generally known in the art. With reference to U.S. Pat. No. 3,040,378, for example, a mechanism for unloading molded articles from a molding machine comprises a substantially rectangular frame which is reciprocally movable from a normal retracted position clear of the mold portions into and out of a space between the mold portions when open for collecting parts ejected by an ejecting mechanism. In the retracted position, the frame is tilted for dumping the molded articles into a collecting bin. Such an unloading mechanism has several disadvantages. First, the mechanism is cumbersome and is not capable of moving between its unloading and retracted positions very rapidly. As a consequence, the number of molded articles produced by such a molding machine in a given time interval is relatively low. Another disadvantage is that if any malfunction occurs in the mechanism used for synchronizing movement between the frame and mold portions, it is possible that the mold portions would close upon the frame thereby causing damage to the frame and/or mold portions.

In U.S. Pat. No. 3,910,740, an ejection control system for use with an injection molding machine is described. The molding machine comprises a pair of mold members movable between a mold-open and a mold-closed position. In the mold-closed position, the mold members define a plurality of mold cavities into which molten plastic is injected to form molded articles. The movable mold portion is provided with a stripper plate and a pair of vertical guide rails. The guide rails are transversely movable by a control mechanism which separates them during a mold closing stroke and drives them towards each other during a mold opening stroke. In operation, the molded article is formed in the mold cavity. The movable mold member then moves to the mold-open position with the molded article adhering thereto. As the movable mold member moves to the mold-open position, the guide rails move toward each other and to a position such that the guide rails bracket the molded article. The stripper plate engages a stop and strips the article from the movable mold member as it continues to its mold-open position, thereby allowing the molded article to descend along a path defined by the guide rails. An overhead blower is disclosed for facilitating and accelerating such descent.

Apparently, the interaction between the guide rails, stripper plate and at least the movable mold portion necessitates that these parts be closely synchronized within tight tolerances. Further, any time the mold members are moved to the mold open position for routine maintenance or repair, the guide rails will be in their operative position thus interfering with attempted maintenance. Still further, any flashing (unwanted small protrusions of plastic material from the molded article) that might form between the molded article and the stripper plate would tend to prevent the article from freely falling down the guide rails. Lastly, the stripper plate would be ineffective for stripping articles having the same outer dimension as the movable mold member, i.e., articles that do not have marginal edges extending laterally outwardly from the movable mold member.

SUMMARY OF THE INVENTION

In accordance with preferred embodiments of the present invention, mold apparatus is disclosed comprising first and second mold members relatively movable between mold-open and mold-closed positions. The first and second mold members are provided with mold cavity surfaces located respectively thereon and cooperating to form a mold cavity when the mold members are in the mold-closed position. A mold material, such as molten plastic, is injected into the mold cavity thus forming the molded article; the mold members then move to the mold-open position while the molded article adheres to the first mold member. Means are provided for ejecting the molded article from the first mold member when the mold members are in the mold-open position. Article guide means receive the molded article from the ejection means and guide the article from the mold members. The article guide means comprises a pair of guide rails movable from a retracted position to an article receiving position wherein the pair of guide rails are in register with the molded article to be received thereby from the ejection means. The pair of guide rails form a chute into which the ejection means eject the molded article. To achieve such synchronous movement of the guide rails, means coupled to the first and second mold members are provided for moving the guide rails from the retracted position to the article receiving position as the first and second mold members move from the mold-closed position to the mold-open position respectively.

As will become apparent from the detailed description of the preferred embodiments presented below, an advantage realized by practice of this invention is to provide a molding machine in which the molded articles are ejected from the mold cavity and transferred to article guide means which guide the articles in a predetermined orientation to a conveyor or collection receptacle. Further, the possibility of jamming of the mold members is remote.

BRIEF DESCRIPTION OF THE DRAWINGS

In the detailed description of the preferred embodiments of the invention presented below, reference is made to the accompanying drawings, in which:

FIG. 6 is an enlarged section view taken substantially along line 6—6 of FIG. 3a;

DESCRIPTION OF THE PREFERRED EMBODIMENTS

Because injection molding machines are well known, the present description will be directed to elements forming part of or cooperating more directly with, apparatus in accordance with the present invention. Molding machine elements not specifically shown or described should be understood to be selectable from those known in the art.

Figure 1:
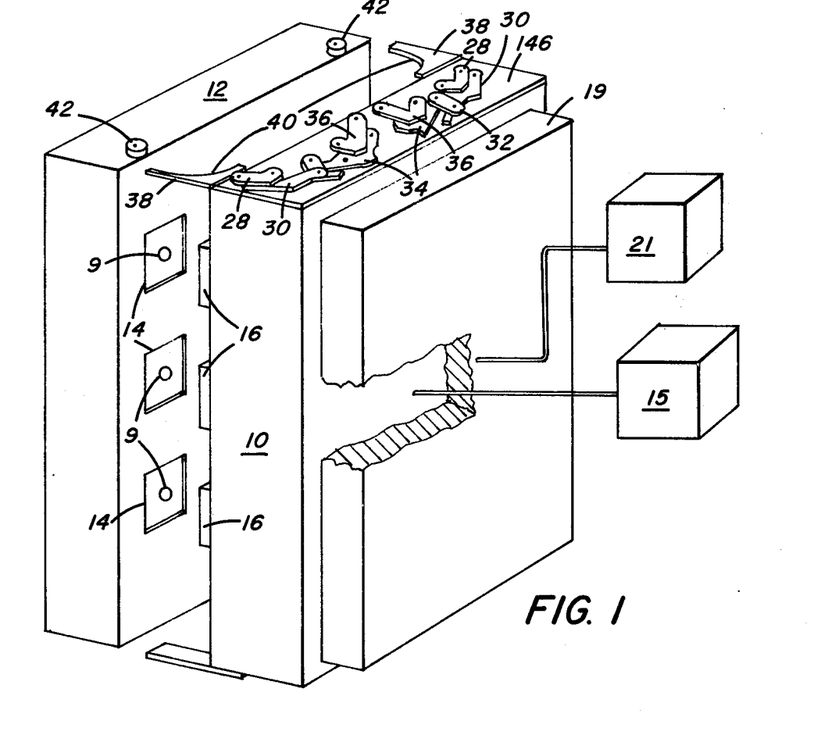
FIG. 1 is a perspective view of a portion of an injection molding machine in which the mold members are in a mold-open position.

FIG. 1 shows a portion of a basic injection molding machine comprising a male mold member 10 and a female mold member 12. Female mold member 12 has a plurality of mold depressions 14 for receiving complementary mold cores 16 on male mold member 10, thereby defining mold cavity surfaces. In operation, female mold member 12 is fixed and male mold member 10 is movable along guide rods (not shown), or other guide means and is reciprocally moved by any suitable mold moving means designated 15 between a mold-open position (as shown in FIG. 1) and a mold-closed position. The mold moving means 15 may comprise a cylinder or ram (not shown) secured to male mold member 10 and powered by suitable means. Of course, rather than male mold member 10 being movable, female mold-member 12 could be made movable or both mold members 10 and 12 made movable.

In the mold-closed position, mold cavity surfaces comprising mold depression 14 and mold core 16 mate, forming a mold cavity therebetween. Molten plastic material is introduced into the mold cavities thus formed via nozzles 9 to produce a molded article. By properly designing mold depression 14 and mold core 16, a wide variety of article shapes, sizes and configurations can be molded.

Once the article has been molded in the cavity formed by the mating of mold depression 14 and mold core 16, male mold member 10 is moved to the mold-open position. Depending upon the surface characteristics of the mold cavity surfaces (mold depression 14 and mold core 16), the molded article can be made to adhere to either the surface of mold depression 14 or the surface of mold core 16. For sake of illustration, it will be assumed that the mold cavity surfaces have properties such that the article adheres to male mold member 10.

A problem arises after the molding operation has been completed and the mold members are in the mold-open position. At this stage, the molded article is adhered to mold core 16 on male mold member 10 (or, alternatively, to the surface of mold depression 14 on female mold member 12). The molded article must now be removed from mold core 16 and handled in such a manner as to facilitate later manufacturing operations.

As discussed above, U.S. Pat. No., 3,910,740 discloses an ejection control mechanism for guiding molded articles from the mold members. In that patent a stripper plate was employed to detach molded articles from the mold cores. In order for this type of stripping operation to work, there must be some edge of the molded article projecting from the mold core which can be engaged by the stripper plate. Many types of molded articles, however, have no such projection. For example, molded articles formed in the cavity of the molding machine shown in FIG. 1 are rectangular, plate-shaped articles. Such articles have no projections or protrusions over the edges of mold core 16, but rather lie wholly upon the face of mold core 16. A stripper plate such as disclosed in U.S. Pat. No. 3,910,740 cannot, therefore, operate effectively. Further, since the guiding mechanism for guiding the molded articles after stripping by the stripper plate is an integral part of the stripper plate, a different type of article guiding apparatus must be employed to handle articles of the type described in connection with the molding machine shown in FIG. 1.

Figures 2A, 2B, 2C:
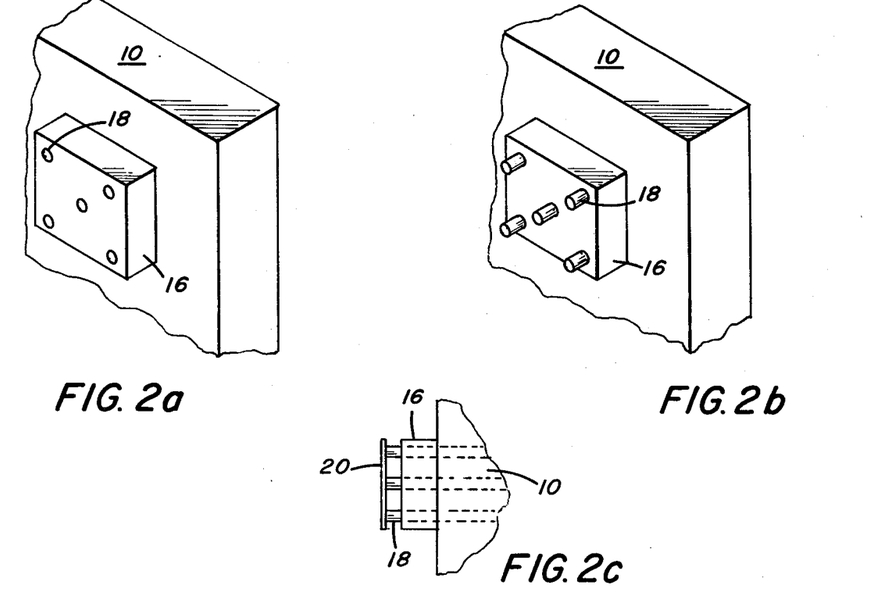
FIGS. 2a and 2b are enlarged perspective views and FIG. 2c is a side elevational view of a corner portion of the male mold member shown in FIG. 1.

FIGS. 2a, 2b and 2c show apparatus for removing molded articles from mold cores 16. A set of ejection pins, one of which is enumerated 18, is supported and movable by an ejector plate 19 (FIG. 1) between a retracted position shown in FIG. 2a and an ejection position shown in FIG. 2b. Ejector plate 19 is reciprocally movable on the same guide means for mold member 10 and is axially spaced from member 10 by springs, not shown. During the article molding step, ejection pins 18 are in the retracted position in which the front end of the pins extend slightly from the surface of mold core 16. The plastic material being molded flows around the extended pin end and the molded article adheres to the pin end and surface of mold core 16 as male mold member 10 moves to the mold-open position. During the latter portion of such movement, ejector plate 19 is moved in the opposite direction by a cylinder 21 (FIG. 1) causing ejection pins 18 to be moved to the ejection position as shown in FIG. 2b. As a result of the contraction of the plastic material around the pin ends, an article 20 (see FIG. 2c) does not fall from the surface of mold core 16 but remains affixed to ejection pins 18. As seen in FIG. 2c, ejection pins 18 support molded article 20 from the surface of mold core 16. In order to remove molded article 20 from ejection pins 18 and to orient article 20 for later manufacturing steps, certain additional apparatus is provided as will now be described.

Figure 3A:
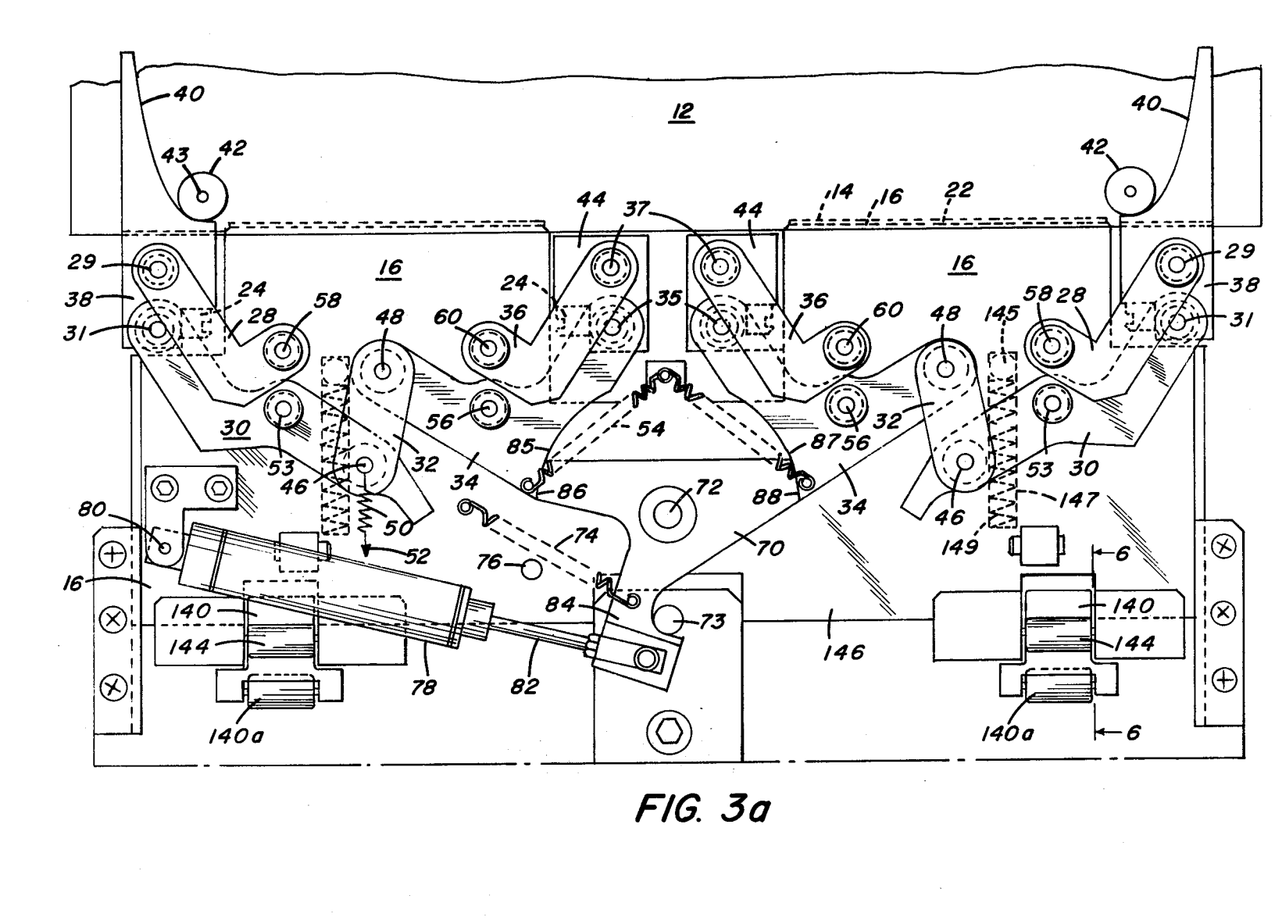
FIGS. 3a and 3b are enlarged plan views of the molding machine of FIG. 1 illustrating one embodiment of the article handling apparatus in retracted and article receiving positions respectively in accordance with the present invention for removing and handling articles molded in the molding machine.
Figure 3B:
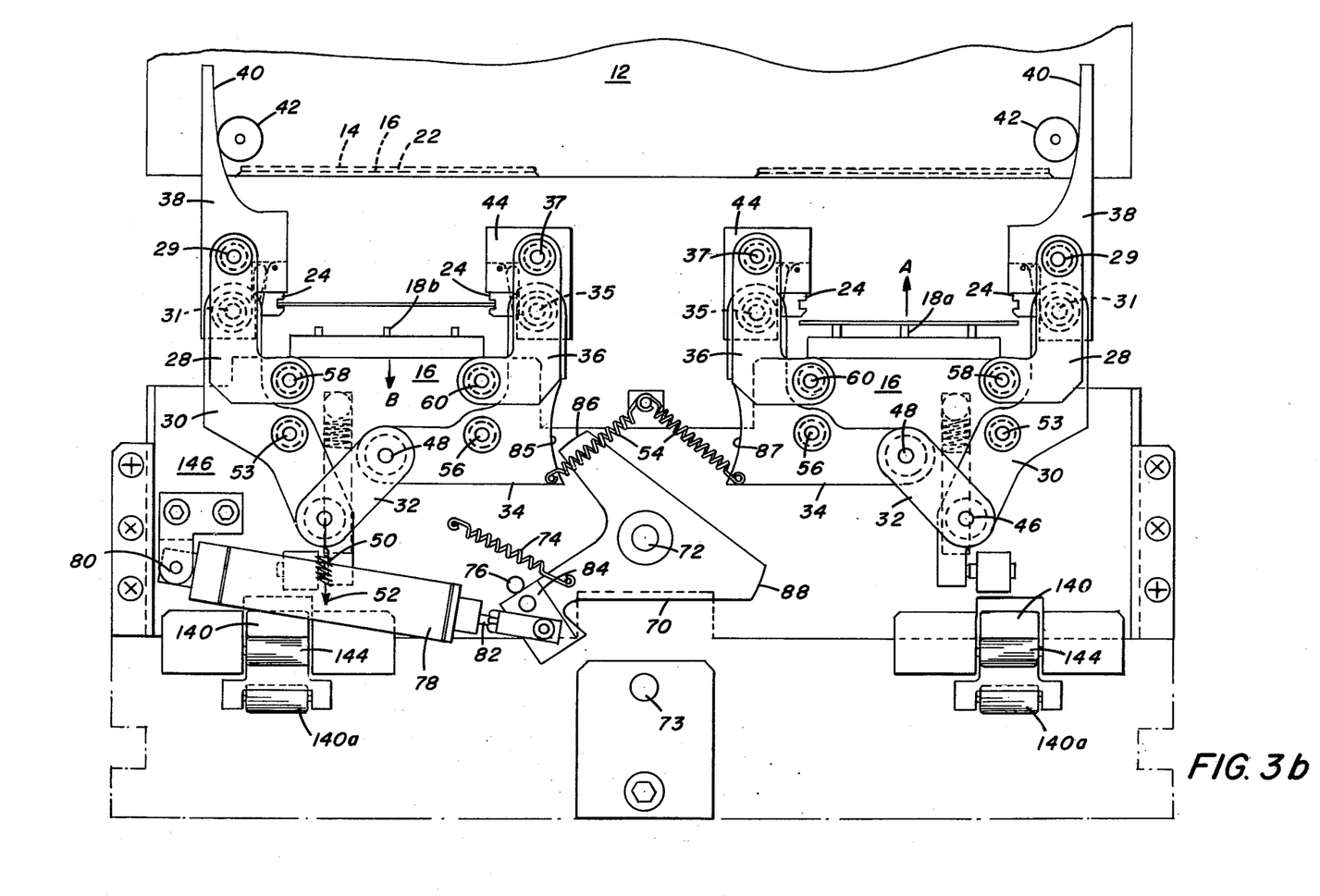

FIGS. 3a and 3b show a top view of the molding machine and article handling apparatus of FIG. 1. In FIG. 3a male and female mold members 10, 12 are shown in the mold-closed position and the article handling apparatus in its retracted position. The mating of the mold cavity surfaces, i.e., mold depression 14 with complementary mold core 16, forms a mold cavity 22. While the particular mold cavity 22 shown in FIG. 3a is suitable for molding relatively thin planar articles, numerous other selections may be made for the shape of mold depression 14 and mold core 16 thereby resulting in molded articles of almost any desired shape or configuration.

A predetermined amount of molten plastic is injected into mold cavity 22 by conventional means such as nozzles 9 shown in FIG. 1. The molten plastic flows throughout mold cavity 22 whereby, upon cooling, a molded article is formed having the shape of cavity 22. It will be noted that the article handling apparatus comprises several link arms, bias springs, cams, cam followers, and guide rails 24. Their function, as discussed below, is to effect removal of an article 20 from ejection pins 18 (see FIG. 2c) and to deliver the article to a conveyor, basket, etc. in a predetermined orientation.

Figure 4A:
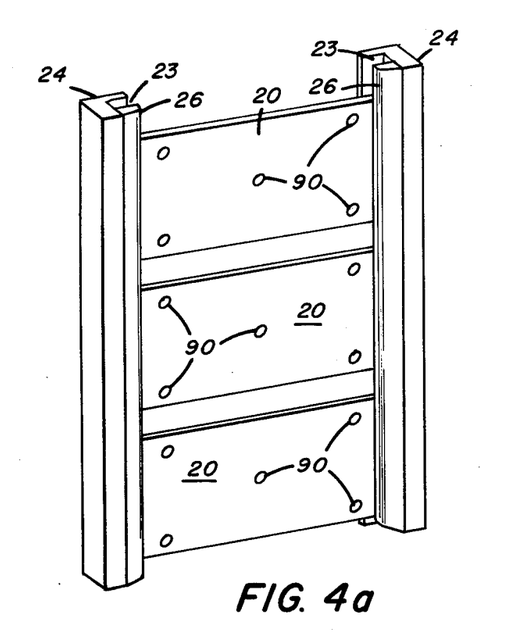
FIGS. 4a and 4b are perspective views of the guide rails of the article handling apparatus of FIGS. 3a and 3b.
Figure 4B:
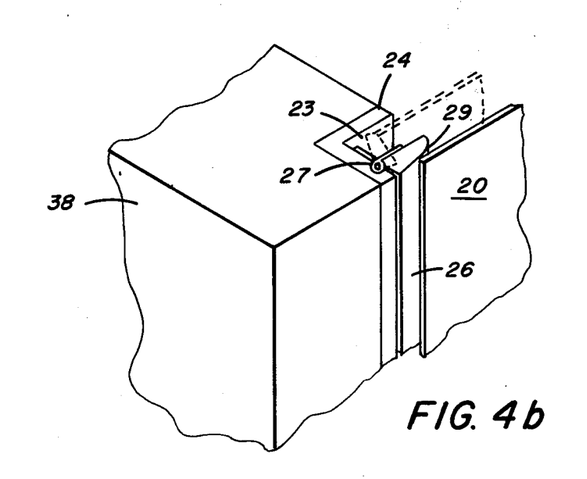

FIG. 3b shows the molding machine and article handling apparatus of FIG. 3a when male and female mold members 10, 12 are in the mold-open position. It is seen that the various link arms have changed orientation in such a manner as to position guide rails 24 (shown in perspective in FIGS. 4a and 4b) near the surface of mold core 16. There are actually two pairs of guide rails 24 shown in FIG. 3b, but since each pair of guide rails 24 operates identically, only one pair will be described in detail. With particular reference to FIGS. 4a and 4b, each guide rail 24 includes an elongated lip portion 26 which along with surfaces of the guide rail defines a channel 23 in the guide rail. Each pair of opposing guide rails 24 and channels 23 thus define a chute along which a molded article 20 may travel. The guide rails 24 are rigidly secured by any suitable means to a guide bar mounting member (38 or 44). The guide rails 24 are spring biased by one or more springs 27 toward ejection pins 18. Accordingly, when male mold member 10 reaches or nears the end of the mold-open position, ejection pins 18 which are in engagement with molded article 20 eject the article from the surface of mold core 16. The guide rails 24 are being positioned, due to the action of the link arms described more fully below, at such a distance from the surface of mold core 16 that ejection pins 18 force article 20 into the chute formed by channels 23 in guide rails 24. To efficiently achieve such transfer, lips 26 of guide rails 24 facing mold core 16 are provided with cam surfaces 29 which are engaged by molded article 20 and pivot away from ejection pins 18 to allow passage of molded article 20 into channel 23. Once molded article 20 passes lips 26 on guide rails 24, the guide rails pivot back to their original position under the influence of springs 27. The ejection pins 18 are then retracted back into the surface of mold core 16 leaving a row of molded articles free to fall vertically downward solely under the influence of gravity. The chute formed by each pair of guide rails 24 serves to guide molded articles 20 to any suitable chute, conveyor, or the like, for transport to a later manufacturing operation. In FIG. 3b, ejection pins 18a are shown in the process of ejecting article 20 from the surface of mold core 16 in the direction of arrow A which occurs as mold members 10, 12 are moved to their open position. Ejection pins 18b are shown retracting back into the surface of mold core 16 in the direction of arrow B which occurs independently of mold members 10, 12 and prior to movement of the mold members to their closed position, leaving article 20 in the chute formed by channels 23 in guide rails 24.

The position of molded articles 20 (three of such articles are shown in FIG. 4a) is such as would occur immediately after the ejection pins have retracted leaving the molded articles in channel 23. At this point, the molded articles 20 are free to fall under the influence of gravity to a waiting conveyor, bin, or other article receiving device.

Each molded article 20 shown in FIG. 4a has five shaded areas, one of which is enumerated 90. These shaded areas represent the slight depressions made by ejection pins 18. As stated above, these depressions occur because the molten plastic material flows around the protruding ends of pins 18 during the article molding step and shrinks onto the pin ends when cooled. This prevents the molded article from dropping from the ejection pins immediately after the adhesion between the surface of the mold core is broken and before the molded article is transferred to chute 23. If this didn't occur, the molded article would then fall in a haphazard, random manner thus defeating the purpose of guide rails 24 which is to provide oriented removal of the molded articles from the ejection pins.

Figure 5A:
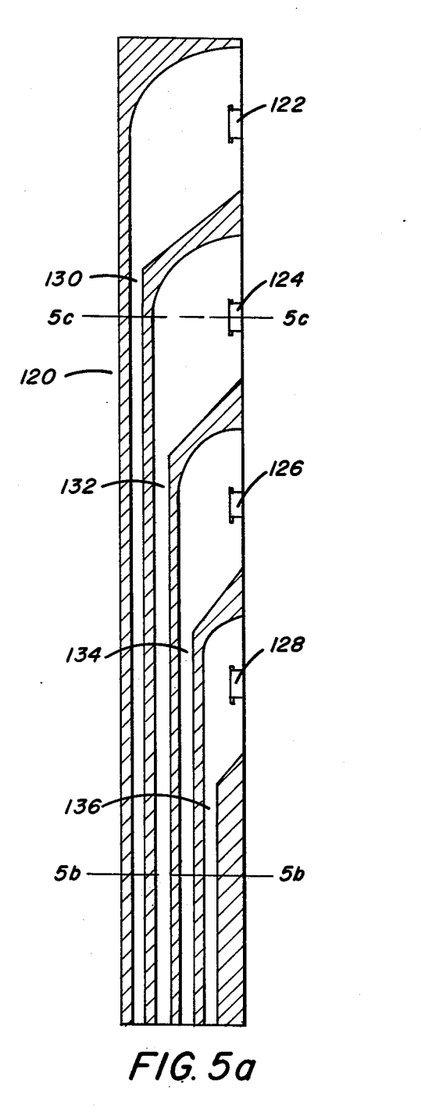
FIG. 5a is a side-elevational view in section and FIGS. 5b and 5c are cross-sectional views along lines 5b—5b and 5c—5c respectively of FIG. 5a, all three figures being views of a guide bar in accordance with one aspect of the invention wherein a plurality of molded articles may be handled separately.
Figure 5B:
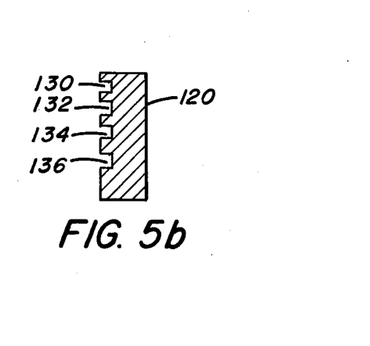
Figure 5C:
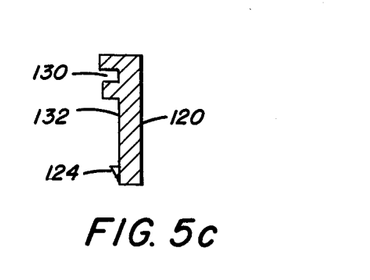

Each guide rail 24 shown in FIGS. 3a, 3b, 4a and 4b defines a channel 23 along which molded articles 20 travel under the influence of gravity. A different-type of guide rail assembly is shown in FIGS. 5a, 5b, and 5c. This guide rail assembly, generally enumerated 120, is capable of receiving and separately handling four molded articles. Spring clips 122, 124, 126 and 128 perform the function of the pivoting actions of the guide rails 24 previously described. Each spring clip, for example spring clip 124, permits a molded article to slide past the spring clip under the influence of the ejection pins but prevents the article from sliding back past the spring clip 124 in the opposite direction. The molded article then moves along the track provided therefor and down one of the respective chutes 130, 132, 134 or 136. (Each chute is formed by a pair of spaced guide rails 120.)

The purpose of providing an article guide rail assembly wherein each of the articles is handled separately is due to an effect termed the "shuffle" effect. To explain the shuffle effect it is necessary to refer back briefly to FIGS. 4a and 4b. For the single channel guide rail assembly shown in these Figures, it is necessary that the chute 23 be substantially wider than the thickness of the molded article 20. This is necessary to ensure free and unhampered falling of the molded articles 20. And as the molded articles 20 fall under the influence of gravity, various factors cause the articles 20 to fall at different rates; the result is that the articles 20 tend to stack one on top of the other, especially at the point at which the articles are fed onto a conveyor or the like. If the molded articles 20 are relatively thin, they begin to "shuffle" i.e., one of the molded articles 20 overtakes the molded article directly below it and, since the chute 23 is larger than the width of the molded articles 20, the upper article 20 partially slides past the lower article 20. The result is that two of the articles 20 become wedged or lodged in the chute 23 thereby preventing, or at least hampering, free fall of molded articles 20. Providing the guide rail assembly as shown in FIG. 5a, however, eliminates this problem because, although each molded article 20 is handled by the same general guide rail assembly 120, each article 20 has its own chute 130, 132, 134 or 136 along which to fall under the influence of gravity. Of course, by the time a second molded article 20 is transferred to one of the chutes, for example chute 130, (this would occur only in the next mold cycle), the first molded article 20 has had sufficient time to travel far enough along the chute 130 to eliminate any chance of interference between successive molded articles 20.

The "programming" governing the synchronous movements of guide rails 24 and ejection pins 18 depends upon the configuration of the article being molded. For some article configurations, it is preferable to have transfer of molded article 20 (from ejection pins 18 to guide rails 24) take place as the guide bars are in motion towards the ejection pins 18 in order to shorten the distance traversed by the pins and article. For other article configurations it may be desirable to have guide rails 24 stationary during transfer.

As is evident from a comparison of FIG. 3a (mold-closed position) and FIG. 3b (mold-open position), guide rails 24 travel from their article receiving position (shown in FIG. 3b) to a spread apart retracted position (shown in FIG. 3a). Such movement of guide rails 24 between the article receiving position and the retracted position is accomplished while requiring only minimal separation between male mold member 10 and female mold member 12 when in the mold-open position. For example, the molding machine can be designed such that male mold member 10 need only be moved about 3 inches between the mold-closed and mold-open positions, as opposed to some commercially available molding machines presently on the market which require separation of 20 inches, or more. The main advantage of reducing the mold separation stems from the fact that male mold member 10 (the movable mold member) is generally large and quite heavy. Being so heavy, it is not practical to move the mold member at a high rate of speed. Thus, production capacity becomes limited by the time required to cycle the mold members between the mold-open and mold-closed positions. Reducing the required mold separation from 20 inches to about 3 inches, therefore, substantially increases production capacity.

As indicated earlier, linkage assemblies of link arms, cams, etc. of the article handling apparatus are employed to provide the movement of guide rails 24 previously described. Each pair of the two pairs of guide rails 24 shown in FIGS. 3a and 3b is supported and moved by top and bottom linkage assemblies of which only the top linkage assembly is shown. A bottom view of the mold apparatus shown in FIGS. 3a and 3b would appear similar, showing the bottom linkage assembly for each pair of guide rails 24. The molding apparatus shown in FIGS. 3a and 3b, therefore, employs four linkage assemblies (two top sets and two bottom sets), to move the two pairs of guide rails in the manner described above. Since all four linkage assemblies operate identically, only one such linkage assembly will be described in detail.

Referring to FIG. 3a, the linkage assembly comprises five link arms 28, 30, 32, 34 and 36 mounted directly on male mold member 10 or on a guide rail assembly plate 146 slidably mounted on mold member 10 by any suitable means, all to be explained in detail hereinafter. The link arms 28 and 30 are pivotally attached via pivot pins 29 and 31 respectively to mounting assembly 38 for one of the guide rails 24. Mounting assembly 38 has a cam surface 40, which surface is tracked by a cam follower 42. Cam follower 42 is rotatable about its center pin 43 which is fixedly attached to female mold member 12. Similarly, link arms 34 and 36 are pivotally mounted to guide rail mounting assembly 44 via pivot pins 35 and 37 respectively. It should be noted that guide rail mounting assembly 44 does not have any cam surface or cam follower associated therewith (unlike guide rail mounting assembly 38). The link arms 30 and 34 are pivotal about pins 53 and 56 respectively on plate 146, and are connected by a link arm 32 pivotally mounted to arms 30 and 34 by pivot pins 46 and 48 respectively. A spring bias 50 is applied to pivot pin 46 and tends to urge link arms 30 and 32 in the direction indicated by arrow 52. A second spring 54 is applied to link arm 34 and produces a spring bias tending to rotate link arm 34 counterclockwise about a pivot pin 56 on plate 146. A final pair of pivot pins 58 and 60 on plate 146 provide pivotal attachment of link arms 28 and 36 respectively to male mold member 10. The springs 50 and 54 have the net effect of constantly urging cam surface 40 of guide rail mounting member 38 against cam follower 42. In the mold closed position illustrated in FIG. 3a, this results in movement of the linkage assemblies and guide rails 24 carried thereby into their retracted position in which the guide rails are clear of the mold members 10, 12.

As the male mold member 10 begins to move to the mold-open position illustrated in FIG. 3b, the interaction of cam surface 40 with cam follower 42 causes guide rail mounting assembly 38 to move along an arcuate path toward female mold member 12 and mold core 16. As shown in FIG. 3b, when male mold member 10 has completed its movement to the mold-open position, guide rail mounting member 38 is positioned substantially in front of mold core 16. The motion of guide rail mounting assembly 38 is transmitted via the five link arms 28, 30, 32, 34 and 36 to guide rail mounting assembly 44 which moves along an arcuate path corresponding to that of guide rail mounting assembly 38. In the mold open position (FIG. 3b) guide rail mounting assembly 44, therefore, assumes the position shown in FIG. 3b. With guide bar mounting assemblies 38 and 44 in this position, guide rails 24 are in their article receiving position to receive molded articles 20 from ejector pins 18b, an operation described in detail above.

The exact arcuate path along which guide rail mounting assemblies 38 and 44 travel is not particularly critical. It is desirable, however, that guide rails 24 do not hit against mold core 16 or female mold member 12. It is not necessary that each guide rail 24 of a pair of guide rails move along the same arcuate path so long as the initial and final positions are as shown in FIGS. 3a and 3b respectively. The arcuate paths taken by guide rail mounting assemblies 38 and 44 depend upon the shape of cam surface 40, the size and shape of link arms 28, 30, 32, 34, and 36 as well as upon the placement of pivot pins 29, 31, 35, 37, 46, 48, 53, 56, 58 and 60, and also upon the tensions of bias springs 50 and 54.

Certain features of the above-described molding machine merit further notice: (1) The power required to effect movement of guide rails 24 between the article receiving position and the retracted position is supplied totally by springs 50, 54 and the movement of male mold member 10 from the mold-closed to the mold-open position. There are no separate motors, pistons, etc; as long as male mold member 10 moves properly, the required movement of guide rails 24 is assured. (2) In the retracted position, guide rails 24 reside in recessed portions of male mold member 10 (as opposed to those commercial molding machines wherein the assembly employed to remove molded articles actually swings down between the male and female mold members 10 and 12 respectively from above, or moves in from the side). This position of guide rails 24 allows the separation between the male and female mold members in the mold-open position to be relatively small since guide rails 24 only need to move along an arcuate path to be in the article receiving position. Other molding machines wherein the mechanism for removing the molded article swings between the male and female mold members from the top or side requires a wider separation between the male and female mold members in the mold-open position to provide the necessary clearance to enable the article removing mechanism to swing into position. As stated above, the smaller the separation between the male and female mold members, the higher the production capacity. (3) The motion of guide rails 24 is separate and independent from the movement of ejection pins 18, thereby allowing a separate operation of each function for timing or stroke adjustment. (4) And, importantly, each article 20 is captured by guide rails 24 in a predetermined orientation. By knowing the orientation of molded article 20, future handling of the article is greatly facilitated. Indeed, this system eliminates the need for reorientation of articles at subsequent post-molding operations (i.e., assembly, inspection, tray loading, etc.).

Referring to FIGS. 3a and 3b, a latch mechanism is provided for latching each pair of guide rails 24 in their retracted position. Such latching is desirable in those situations wherein an operator desires to perform routine maintenance or repair on the molding machine. Since such maintenance is performed in the mold-open position (FIG. 3b), the guide rails 24 which are normally in their article receiving position would interfere with such activity. The latch mechanism comprises a latch member 70 pivotally mounted to male mold member 10 on a pivot pin 72. A spring 74 urges latch member 70 against a stop 76 to the unlatched position shown in FIG. 3b. In this position, the latching mechanism does not interfere with the normal operation of the link arms and subsequent movement of guide rails 24. The latching mechanism is operated by a power cylinder 78 of any suitable type having one end pivotally secured to male mold member 10 by a cylinder mounting block 80. The power cylinder 78 has a movable rod 82 connected to an arm 84 of latch member 70. Accordingly, actuation of power cylinder 78 causes latch member 70 to pivot about pivot pin 72 in a counterclockwise direction into engagement with a stop pin 73. This movement causes a pair of arcuate latch surfaces 86 and 88 to engage complementary arcuate surfaces 85 and 87 on link arms 34. Link arms 34 (and the remainder of the link arms as well) are now latched in the mold-closed position. As the mold members 10, 12 move to the mold-open position the link arms and thus the guide bars 24 remain in the mold-closed, or retracted, position thereby facilitating maintenance or repair.

In the molding of flat or similar articles, it is preferable to decrease the distance between the guide rails 24 and the ends of pins 18 as much as possible during movement of the guide rails to their article receiving position. This minimizes the likelihood of the articles falling from the pins before they have been transported to the chute formed by the guide rails. To achieve this objective, apparatus is provided as disclosed in FIGS. 3a and 6 for simultaneously moving guide rails 24 and pins 18 toward one another as the guide rails are being moved to their article receiving position and the pins are being simultaneously moved outwardly to eject an article. The apparatus comprises L-shaped cam links 140 pivotally mounted on pins 142 supported adjacent the four corners of the male mold member 10, two of which are shown in each of FIGS. 3a and 3b. One end of each cam link 140 engages a corresponding roller 144 mounted on the guide rail assembly plate 146. Plate 146 is slidably mounted on mold member 10 by pin and slot connections 145, 147 respectively, two of which are shown in each of FIGS. 3a and 3b. Plate 146 is normally biased toward mold member 12 by springs 149 in slots 147.

Figure 6:
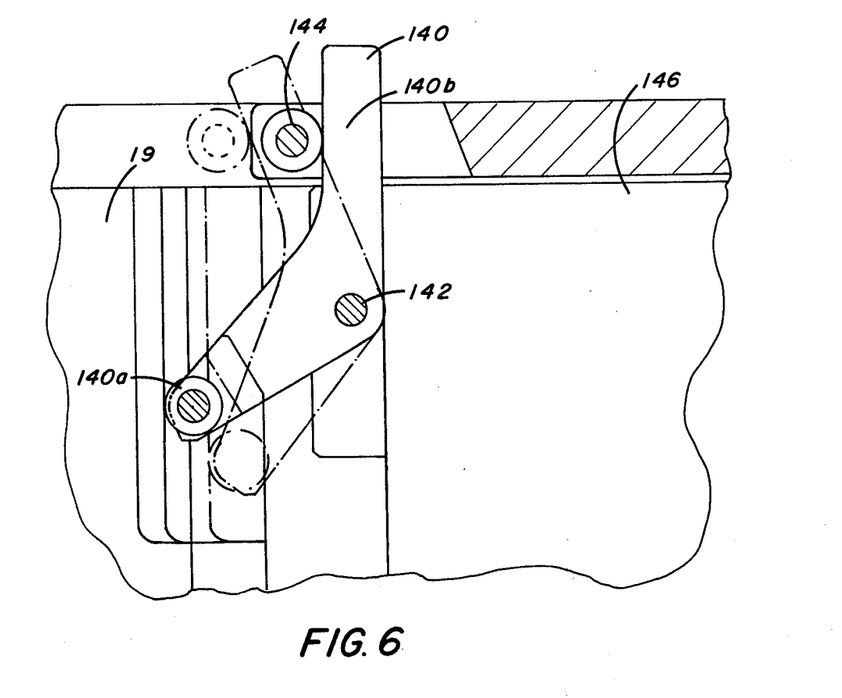

When guide rails 24 are being moved to their article receiving position, forward movement of the ejector plate 19 and pins 18 to strip and transport the articles from the cores 16 causes plate 19 to engage and pivot the other ends 140a of cam links 140. This causes cam link ends 140b to simultaneously move rollers 144 and guide rail assembly plate 146 toward the pins 18 to decrease the distance therebetween. The speed of movement and the distances through which the pins and assembly plate are moved can be adjusted or controlled by varying the length of the legs of the cam links 140 and the location of the pivot pins 142.

Figure 7A:
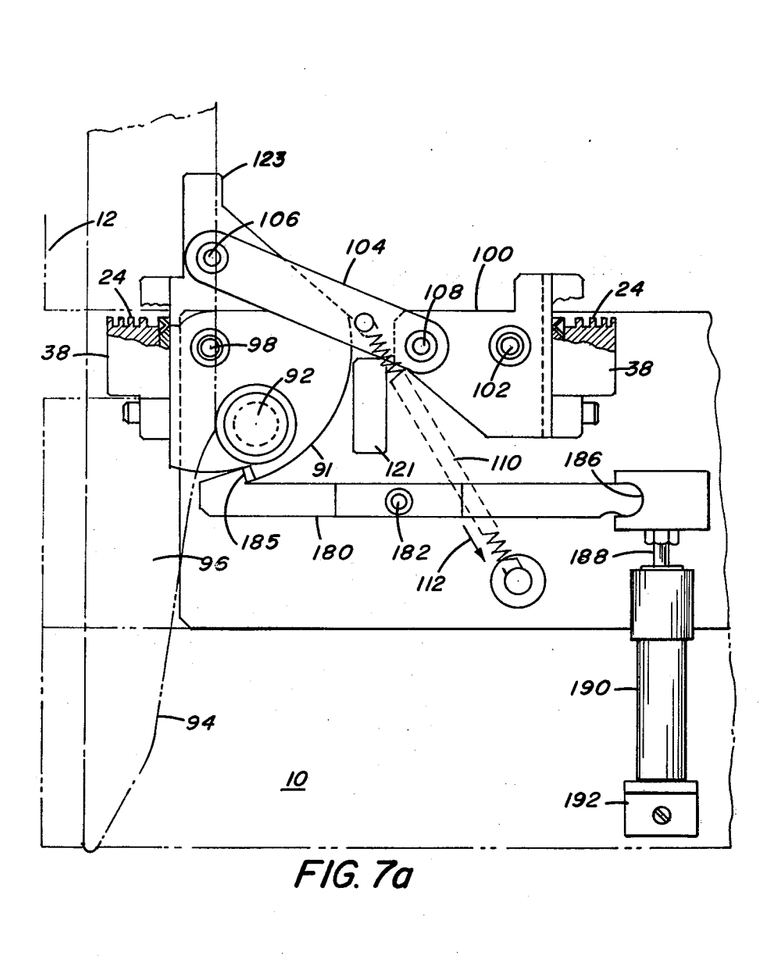
FIGS. 7a and 7b are plan views of one half of the article molding machine shown in FIG. 1 wherein an article handling apparatus in accordance with another embodiment of the invention is shown, such apparatus effecting removal and handling of articles molded in the molding machine.
Figure 7B:
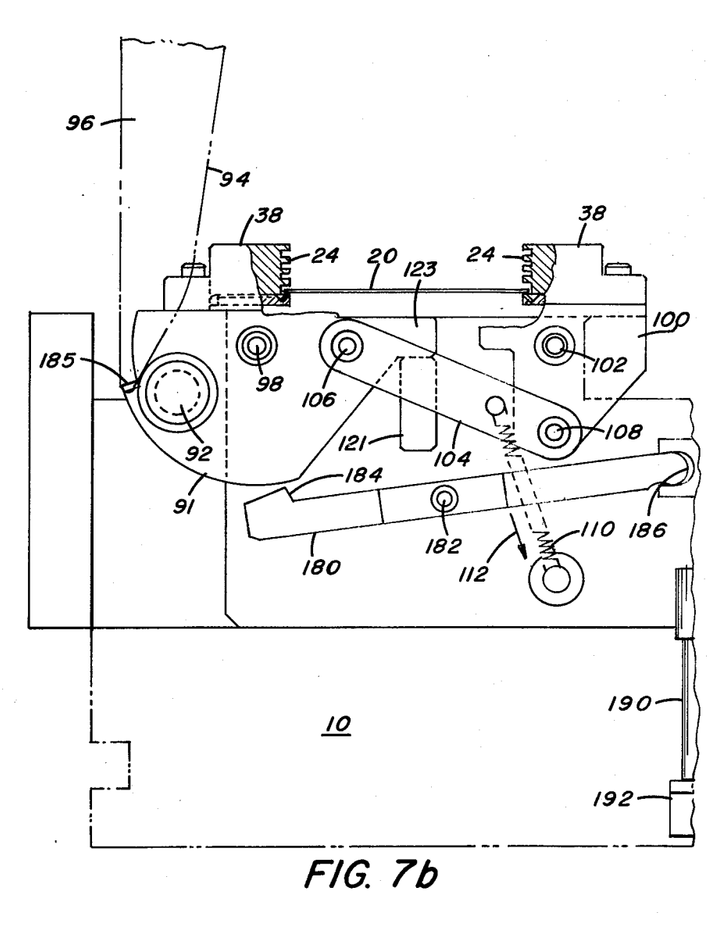

FIGS. 7a and 7b are segmental plan views of the basic mold machine shown in FIG. 1 illustrating apparatus comprising a second embodiment of the invention. The apparatus shown in those figures performs basically the same function as the linkage assemblies described in connection with FIGS. 3a and 3b. The movement of guide rails 24 produced by the shown guide rail movement mechanism is a simple pivot movement, rather than the more complicated movement along some general arcuate path as in FIGS. 3a and 3b. The movement mechanism shown in FIGS. 7a and 7b for accomplishing such pivotal motion comprises a guide rail movement member 91 having attached thereto a cam follower 92 which follows a cam surface 94 on a guide member 96. The guide member 96 is fixedly attached to female mold member 12. Guide rail mounting member 91 is pivotally attached via pivot pin 98 to male mole member 10. A second guide rail mounting member 100 is also pivotally attached via a pivot pin 102 to male mold member 10. The guide rail mounting members 91 and 100 are connected by a link arm 104 which is pivotally attached to mounting members 91 and 100 by a pair of pivot pins 106 and 108 respectively. A spring 110 urges link arm 104 in the direction indicated by arrow 112. The spring bias has the effect of constantly urging cam follower 92 snugly against cam surface 94.

As is shown in FIG. 7b, as male mold member 10 moves to the mold-open position, cam follower 92 follows cam surface 94 thereby causing guide rail mounting member 91 to pivot in a clockwise direction about pivot pin 98. This pivotal motion of guide rail mounting member 91 is transmitted by link arm 104 to guide rail mounting member 100 which is pivoted about pivot pin 102 in a counterclockwise direction. The pivoting action of guide rail mounting members 91 and 100 causes guide rails 24 to pivot from their retracted position (FIG. 7a) to the article receiving position (FIG. 7b). Thus, while the mechanism for causing movement of the guide rails 24 shown in FIGS. 7a and 7b is quite different from the mechanism for moving guide rails 24 shown in FIGS. 3a and 3b, the net effect upon the guide rails is similar, i.e., the guide rails move from a retracted position when the mold is in the mold-closed position (FIGS. 3a and 7a) to an article receiving position when the mold is in the mold-open position (FIGS. 3b and 7b). A stop member 121 engages a portion 123 of mounting member 91 and prevents mounting members 91, 100 from over pivoting, thus assuring that the guide rails 24 are in the proper position for receiving an article 20.

Also shown in FIGS. 7a and 7b is a latch mechanism for latching the guide rails in the wide open retracted position. As was discussed in connection with FIGS. 3a and 3b such a latching mechanism is desirable for purposes of routine maintenance or repair. The latch mechanism comprises a latch arm 180 pivotally mounted to male mold member 10 on a pivot pin 182. A power cylinder 190 is attached to male mold member 10 by a cylinder mounting bracket 192. A rod 188 is movable in and out of cylinder 190. One end of rod 188 is pivotally attached to latch member 180 by a ball and socket connection 186. In the position shown by the solid line in FIG. 7b, latch member 180 does not interfere with normal operation of the guide rail moving mechanism. Upon actuation of power cylinder 190, rod 188 is retracted back into cylinder 190 thereby causing latch member 180 to pivot in a clockwise direction about pivot pin 182 to a latching position indicated by solid lines in FIG. 7a. In this position, a surface 184 of latch member 120 engages a shoulder 185 of guide rail mounting member 91 for preventing member 91 from rotating in a clockwise direction about pivot pin 98. Therefore, as male mold member 10 moves from the mold-closed position to the mold-open position, cam follower 92 no longer follows cam surface 94. Instead, guide rails 24 remain in the wide open retracted position shown in FIG. 7a.

Figure 8A:
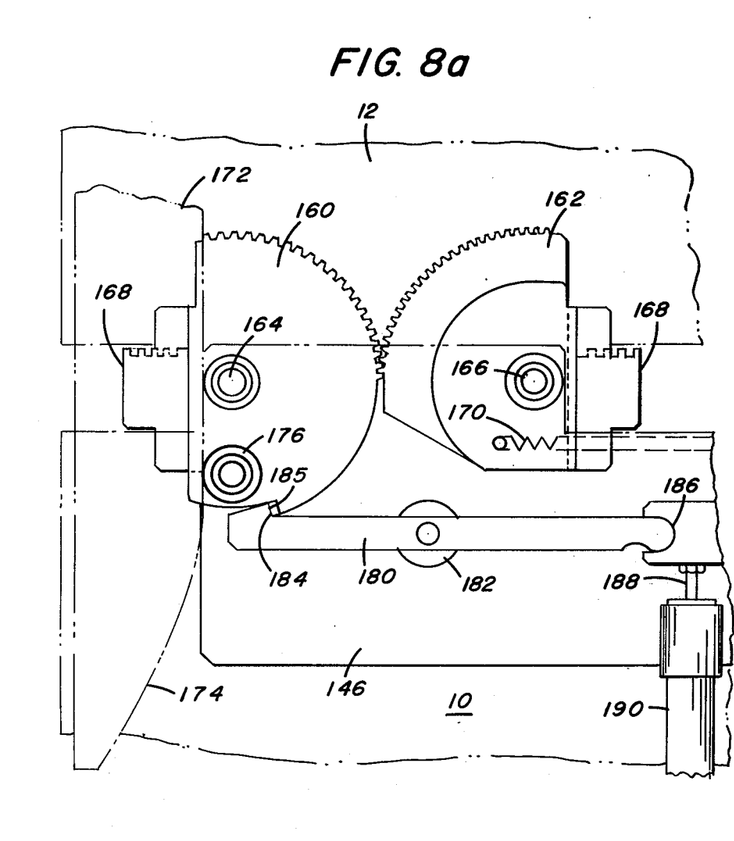
FIGS. 8a and 8b are plan views similar to FIGS. 7a and 7b of still another embodiment of the article handling apparatus of the invention.
Figure 8B:
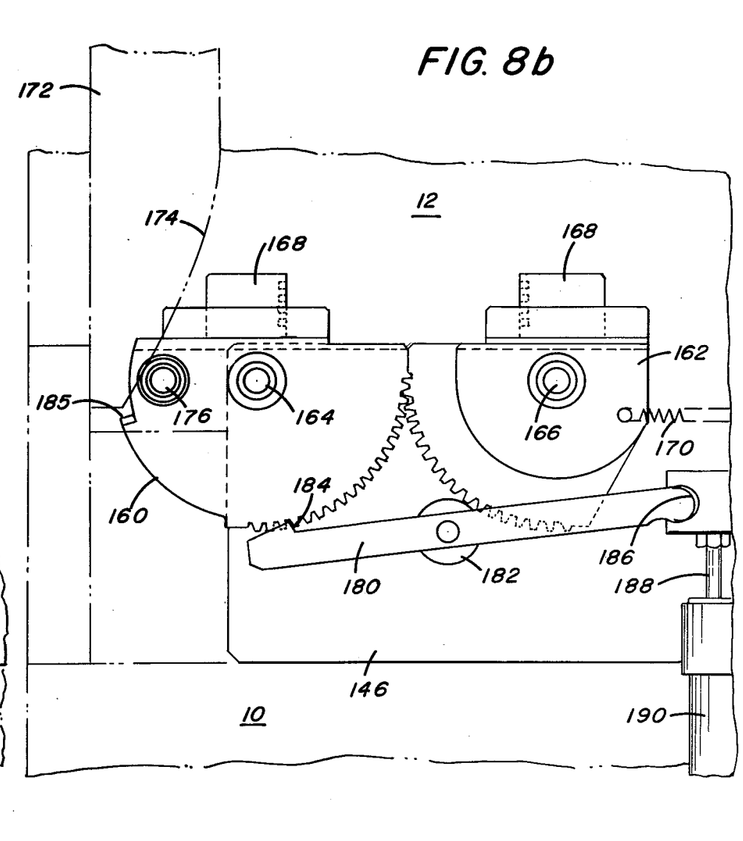

FIGS. 8a and 8b are segmental plan views of the basic mold machine shown in FIG. 1 illustrating apparatus comprising a third embodiment of the invention. The apparatus shown in these figures performs basically the same function as the apparatus described in the previous embodiments, namely, moving guide rails from a retracted position to an article receiving position wherein the guide rails are in register with the molded article to be received from the ejection means. The apparatus for each pair of guide rails at opposite ends of the mold members 10, 12 comprises a pair of intermeshing gears 160, 162 rotatably mounted on stub shafts 164, 166 carried by a guide rail assembly plate 146, if one is used, or directly on one of the mold members 10, 12. A guide rail assembly 168 (of any of the type previously described) is secured by any suitable means to each gear 160, 162. A spring 170 attached to one of the gears 162 normally biases the gears and guide rail assembly into an article receiving position as seen in FIG. 8b when the mold members 10, 12 are in their open position. A guide member 172 secured to the other mold member 12 has an arcuate cam surface 174 engageable with a radially spaced cam follower roller 176 on one of the gears 160. Accordingly, as the mold members 10, 12 are moved to a closed molding position, the cam surface 174 on guide member 172 moves cam roller 176 and gears 160, 162 through an angle of approximately 90° causing the guide rail assembly 168 attached thereto to move to its retracted position clear of the mold members as seen in FIG. 8a.

The latch mechanism for latching the guide rail assembly in the wide open retracted position is substantially identical to the latch mechanism described in connection with FIGS. 7a and 7b, and hence the parts thereof are denoted by the same numerals.

The invention has been described in detail with particular reference to preferred embodiments thereof, but it will be understood that variations and modifications can be effected within the spirit and scope of the invention.

What is claimed is:

1. Molding apparatus comprising:
first and second mold members relatively movable between a mold-open and a mold-closed position and having first and second mold cavity surfaces respectively thereon, said cavity surfaces cooperating to form a mold cavity when said first and second mold members are in said mold-closed position;
means for relatively moving said first and second mold members between said mold-open and mold-closed positions;
means for supplying a mold material to said mold cavity when said first and second mold members are in said mold-closed position for forming a molded article which adheres to said first mold member as said first and second mold members move to said mold-open position;
means for ejecting a molded article from said first mold member;
article guide means for receiving the molded article from said ejection means and for guiding the article therefrom, said article guide means comprising a pair of guide rails movable from a retracted position to an article receiving position wherein said pair of guide rails are in register with the molded article to be received from said ejection means, each of said guide rails of said article guide means defines a channel therein cooperating with the channel defined by the other of said guide rails to form a chute into which the molded article is received from said ejection means and along which the molded article travels from said mold members, each of said guide rails defines a pivotally mounted cam surface engageable by the molded article when being ejected from said first mold member by said ejection means, such engagement causing said cam surfaces to pivot, thereby allowing the molded article to be received by said chute defined by said pair of guide rails, and the remaining portion of each of said guide rails being held generally in a non-pivotal manner relative to said first mold member as the molded article is ejected by said ejection means and received by said chute; and
means coupled to said first and second mold members for moving said guide rails from said retracted position to said article receiving position as said first and second mold members move from said mold-closed position to said mold-open position respectively.

2. Apparatus as claimed in claim 1 further comprising latch means for latching said pair of guide rails in said retracted position when said first and second mold members are in said mold-open position, thereby facilitating maintenance and repair of said mold apparatus.

3. Molding apparatus comprising:
first and second mold members relatively movable between a mold-open and a mold-closed position and having first and second mold cavity surfaces respectively thereon, said cavity surfaces cooperating to form a plurality of mold cavities when said first and second mold members are in said mold-closed position;
means for relatively mmoving said first and second mold members between said mold-open and mold-closed positions;
means for supplying a mold material to said mold cavities when said first and second mold members are in said mold-closed position for forming molded articles which adhere to said first mold member as said first and second mold members move to said mold-open position;
means for ejecting the molded articles from said first mold member;
article guide means for receiving the molded articles from said ejection means and for guiding the articles therefrom, said article guide means comprising a pair of guide rails movable from a retracted position to an article receiving position wherein said pair of guide rails are in register with the molded articles to be received from said ejection means, said guide rails of said article guide means define a plurality of channels therein cooperating with the channels defined by the other of said guide rails to form a plurality of chutes into which the molded articles are received respectively from said ejection means and along which the molded articles travel, each of said guide rails defines a plurality of pivotally mounted cam surfaces engageable by the molded articles when being ejected from said first mold member by said ejection means, such engagement causing said cam surfaces to pivot, thereby allowing the molded articles to be respectively received by said plurality of chutes defined by said pair of guide rails, and the remaining portion of each of said guide rails being held generally in a non-pivotal manner relative to said first mold member as the molded articles are ejected by said ejection means and respectively received by said plurality of chutes; and means coupled to said first and second mold members for moving said guide rails from said retracted position to said article receiving position as said first and second mold members move from said mold-closed position to said mold-open position respectively.

4. Apparatus as claimed in claim 3 further comprising latch means for latching said pair of guide rails in said retracted position when said first and second mold members are in said mold-open position, thereby facilitating maintenance and repair of said mold apparatus.

5. In molding apparatus including a mold member having a mold surface to which a molded article adheres, and means for ejecting the molded article from said mold member, the improvement comprising:

a pair of guide rails movable from a retracted position to an article receiving position to receive the molded article from said ejection means, each of said guide rails having a movable cam surface engageable by the molded article when ejected from said mold member by said ejection means, such engagement causing said cam surfaces to move, thereby allowing the molded article to be received by said guide rails.

6. Apparatus as claimed in claim 5 wherein said guide rails, other than said movable cam surfaces, are held in a generally immovable manner as the molded article is received from said ejection means.

7. Apparatus as claimed in claim 5 wherein each of said guide rails defines a channel therein cooperating, when said guide rails are in the article receiving position, with the channel defined by the other of said guide rails to form a chute into which the molded article is received from said ejection means.

8. Molding apparatus comprising:

a mold member having a mold surface to which a molded article adheres after a molding operation;

means for ejecting the molded article from said mold surface, said ejecting means including at least one ejection pin movable between a retracted position at which said pin slightly protrudes from said mold surface and an ejection position at which said pin extends from said mold surface, whereby the molded article remains affixed to said ejection pin as it moves to said ejection position;

means for moving said ejection pin between said retracted position and said ejection position; and a pair of guide rails movable from a retracted position to an article receiving position to receive the molded article from said ejection means, each of said guide rails having a movable cam surface engageable by the molded article as said ejection pin moves to or is in said ejection position, such engagement causing said cam surfaces to move, thereby allowing the molded article to move past said cam surfaces and be retained by said guide rails upon retraction of said ejection pin.

* * * * *